(12) United States Patent
Kim et al.

(10) Patent No.: US 10,923,717 B2
(45) Date of Patent: Feb. 16, 2021

(54) LITHIUM ION SECONDARY BATTERY

(71) Applicant: LG CHEM, LTD., Seoul (KR)

(72) Inventors: Su-Hwan Kim, Daejeon (KR);
Jong-Hyun Chae, Daejeon (KR);
Jang-Bae Kim, Daejeon (KR); Ji-Hye Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 93 days.

(21) Appl. No.: 16/099,616

(22) PCT Filed: Nov. 3, 2017

(86) PCT No.: PCT/KR2017/012440
§ 371 (c)(1),
(2) Date: Nov. 7, 2018

(87) PCT Pub. No.: WO2018/084652
PCT Pub. Date: May 11, 2018

(65) Prior Publication Data
US 2019/0190022 A1 Jun. 20, 2019

(30) Foreign Application Priority Data

Nov. 3, 2016 (KR) .......... 10-2016-0145937
Nov. 10, 2016 (KR) .......... 10-2016-0149641

(51) Int. Cl.
*H01M 4/48* (2010.01)
*H01M 4/131* (2010.01)
(Continued)

(52) U.S. Cl.
CPC .......... *H01M 4/483* (2013.01); *H01M 4/131* (2013.01); *H01M 10/0525* (2013.01);
(Continued)

(58) Field of Classification Search
CPC ............... H01M 4/131; H01M 4/483; H01M 2004/021; H01M 2004/028;
(Continued)

(56) References Cited

U.S. PATENT DOCUMENTS 3,929,504 A 12/1975 Gore et al.
8,617,742 B2 12/2013 Takahata et al.
(Continued)

FOREIGN PATENT DOCUMENTS

CN 101375437 A 2/2009
CN 106058311 A 10/2016
(Continued)

OTHER PUBLICATIONS

Gu et al., "Lithium-Iron Fluoride Battery with In Situ Surface Protection", Advanced Functional Materials, vol. 26, 2016, pp. 1507-1516.
(Continued)

*Primary Examiner* — Brittany L Raymond
(74) *Attorney, Agent, or Firm* — Birch, Stewart, Kolasch & Birch, LLP.

(57) ABSTRACT

A secondary battery using a vanadium oxide as a positive electrode active material is provided. The secondary battery is prevented from degradation of capacity by preventing dissolution of vanadium. The vanadium oxide includes secondary particles formed by assemblage of primary particles.

11 Claims, 5 Drawing Sheets

(51) Int. Cl.
    *H01M 10/0525*     (2010.01)
    *H01M 10/0568*     (2010.01)
    *H01M 10/0569*     (2010.01)
    *H01M 4/02*     (2006.01)

(52) U.S. Cl.
    CPC ... *H01M 10/0568* (2013.01); *H01M 10/0569* (2013.01); *H01M 2004/021* (2013.01); *H01M 2004/028* (2013.01); *H01M 2300/0028* (2013.01)

(58) Field of Classification Search
    CPC ......... H01M 10/0525; H01M 10/0568; H01M 10/0569; H01M 2300/0028
    See application file for complete search history.

(56) References Cited

U.S. PATENT DOCUMENTS

| | | | |
|---|---|---|---|
| 8,872,207 | B2 | 10/2014 | Jeong et al. |
| 8,951,436 | B2 | 2/2015 | Hashiba et al. |
| 9,276,290 | B2 | 3/2016 | Han et al. |
| 2004/0106047 | A1 | 6/2004 | Mie et al. |
| 2004/0137326 | A1 | 7/2004 | Munshi |
| 2008/0118841 | A1 | 5/2008 | Kim et al. |
| 2009/0017378 | A1 | 1/2009 | Charest et al. |
| 2009/0081534 | A1* | 3/2009 | Takami ............... H01M 2/1626 429/149 |
| 2011/0084238 | A1 | 4/2011 | Hibst et al. |
| 2013/0011730 | A1 | 1/2013 | Bae et al. |
| 2013/0062575 | A1 | 3/2013 | Wietelmann |
| 2014/0272605 | A1 | 9/2014 | Lim et al. |
| 2015/0017540 | A1 | 1/2015 | Wata et al. |
| 2015/0249269 | A1 | 9/2015 | Yoon et al. |
| 2015/0263379 | A1* | 9/2015 | Xiao ................. H01M 10/0445 429/161 |
| 2015/0303471 | A1 | 10/2015 | Choi et al. |
| 2016/0218394 | A1 | 7/2016 | Yamada et al. |
| 2016/0233549 | A1 | 8/2016 | Tiruvannamalai et al. |
| 2016/0294005 | A1 | 10/2016 | Lee et al. |

FOREIGN PATENT DOCUMENTS

| | | |
|---|---|---|
| EP | 1 315 226 A2 | 5/2003 |
| EP | 3 076 470 A1 | 10/2016 |
| JP | S56-147368 A | 11/1981 |
| JP | H4-341767 A | 11/1992 |
| JP | H07-226231 A | 8/1995 |
| JP | H07-230801 A | 8/1995 |
| JP | 7-335256 A | 12/1995 |
| JP | H9-245829 A | 9/1997 |
| JP | 2003-229124 A | 8/2003 |
| JP | 2004-165151 A | 6/2004 |
| JP | 2008-123824 A | 5/2008 |
| JP | 2008-130543 A | 6/2008 |
| JP | 2009-129638 A | 6/2009 |
| JP | 2011-523614 A | 8/2011 |
| JP | 2013-073075 A | 4/2013 |
| JP | 2013-140791 A | 7/2013 |
| JP | 2015-133312 A | 7/2015 |
| JP | 2015-522210 A | 8/2015 |
| JP | 2015-526873 A | 9/2016 |
| KR | 10-2010-059023 * | 6/2010 |
| KR | 10-1044577 B1 | 6/2011 |
| KR | 10-2012-0046226 A | 5/2012 |
| KR | 10-2013-0004491 A | 1/2013 |
| KR | 10-2013-0041797 A | 4/2013 |
| KR | 10-1275789 B1 | 6/2013 |
| KR | 10-1309156 B1 | 9/2013 |
| KR | 10-2014-0066645 A | 6/2014 |
| WO | WO 2013/140791 A1 | 9/2013 |

OTHER PUBLICATIONS

International Search Report for PCT/KR2017/012440 (PCT/ISA/210) dated Feb. 19, 2018.
Qian et al., "High rate and stable cycling of lithium metal anode", Nature Communications, vol. 6, 2015, pp. 1-9.
Geng, M., et al, "High Performance Vanadium Pentoxide for Lithium Ion Battery,"Journal of the Chinese Ceramic Society, Jul. 2011, vol. 39, No. 7, pp. 1130-1134.

* cited by examiner

LITHIUM ION SECONDARY BATTERY

TECHNICAL FIELD

The present application claims priority to Korean Patent Application No. 10-2016-0145937 filed on Nov. 3, 2016 and Korean Patent Application No. 10-2016-0149641 filed on Nov. 10, 2016 in the Republic of Korea, the disclosures of which are incorporated herein by reference. The present disclosure relates to a secondary battery using a vanadium oxide as a positive electrode active material, and more particularly, to a lithium ion secondary battery in which degradation of capacity is prevented by preventing dissolution of vanadium.

BACKGROUND ART

As portable electronic instruments, such as cellular phones or notebook computers, have been developed, rechargeable secondary batteries have been increasingly in demand as energy sources thereof. Recently, use of secondary batteries has been realized as power sources for hybrid electric vehicles (HEV) and electric vehicles (EV). Therefore, many studies have been conducted about secondary batteries which meet various needs. Particularly, lithium secondary batteries having high energy density, high discharge voltage and high output tend to be in increasingly in demand.

Manganese dioxide, fluorinated graphite, etc. are used for primary batteries. However, as positive electrode active materials for lithium secondary batteries, the following materials have been suggested: sulfides, such as $TiS_2$ and $MoS_2$; metal oxides, such as manganese dioxide and vanadium pentoxide ($V_2O_5$); lithium-containing transition metal composite oxides, such as lithium cobaltate, lithium nickel oxide and lithium manganese oxide; or the like. Among those, vanadium pentoxide is capable of lithium ion intercalation/deintercalation and has high theoretical capacity. In addition, a non-aqueous electrolyte battery including a positive electrode using vanadium pentoxide in combination with a lithium negative electrode shows little self-discharge, and thus is used for backup applications. For example, Japanese Patent Laid-Open No. Hei7-226231 suggests a lithium secondary battery for use in backup applications or portable power sources, which uses a positive electrode including vanadium pentoxide and aluminum powder and a negative electrode including lithium-doped niobium pentoxide.

However, since vanadium pentoxide has a high charging potential, a positive electrode may be exposed to a significantly high potential in an over-charged state. When the positive electrode potential is increased, vanadium pentoxide is oxidized and dissolved out to a non-aqueous electrolyte to cause side reactions at a negative electrode, resulting in degradation of the characteristics of a battery. In addition, vanadium oxide has a problem of a low lithium ion diffusion coefficient.

DISCLOSURE

Technical Problem

The present disclosure is designed to solve the problems of the related art, and therefore the present disclosure is directed to providing a lithium ion battery which is improved in terms of capacity degradation and output characteristics while using a vanadium oxide as a positive electrode active material. It is apparent to those skilled in the art that these and other objects and advantages of the present disclosure may be realized by the means shown in the appended claims and combinations thereof.

Technical Solution

In one aspect of the present disclosure, there is provided a lithium ion secondary battery which solves the above-mentioned technical problems. According to a first embodiment of the present disclosure, there is provided a lithium ion secondary battery which includes an electrode assembly and an electrolyte, wherein the electrode assembly includes a positive electrode, a negative electrode and a separator interposed between the positive electrode and the negative electrode, the positive electrode includes vanadium oxide as a positive electrode active material, the electrolyte includes a non-aqueous solvent and a lithium salt, the non-aqueous solvent includes ethylene glycol dimethyl ether (DME), and the lithium salt includes lithium bis(fluorosulfonyl)imide (LiFSI).

According to a second embodiment, there is provided the lithium ion secondary battery of the first embodiment, wherein the vanadium oxide includes secondary particles formed by assemblage of primary particles.

According to a third embodiment, there is provided the lithium ion secondary battery of the first embodiment or the second embodiment, wherein the concentration of the lithium salt in the electrolyte is 0.5-7 mol/L.

According to a fourth embodiment, there is provided the lithium ion secondary battery of the third embodiment, wherein the concentration of the lithium salt in the electrolyte is 0.5-4 mol/L.

According to a fifth embodiment, there is provided the lithium ion secondary battery of the third embodiment, wherein the concentration of the lithium salt in the electrolyte is 4-7 mol/L.

According to a sixth embodiment, there is provided the lithium ion secondary battery of any one of the first to the fifth embodiments, wherein the vanadium oxide is $V_aO_b$ (wherein $1 \leq a \leq 6$ and $2 \leq b \leq 13$).

According to a seventh embodiment, there is provided the lithium ion secondary battery of any one of the second to the sixth embodiments, wherein the vanadium oxide primary particles have a particle diameter ($D_{50}$) of 10 nm-1 μm, and the vanadium oxide secondary particles have a particle diameter ($D_{50}$) of 500 nm-50 μm.

According to an eighth embodiment, there is provided the lithium ion secondary battery of any one of the first to the seventh embodiments, wherein the positive electrode includes the vanadium oxide in an amount of 50 wt % or more based on the total weight of the positive electrode active material contained in the positive electrode.

According to a ninth embodiment, there is provided the lithium ion secondary battery of any one of the second to the eighth embodiments, wherein the vanadium oxide includes the vanadium oxide secondary particles in an amount of 70-100 wt % based on the total weight of the vanadium oxide.

According to a tenth embodiment, there is provided the lithium ion secondary battery of any one of the second to the ninth embodiments, wherein the vanadium oxide secondary particles have a particle porosity of 0.1-35%.

According to an eleventh embodiment, there is provided the lithium ion secondary battery of any one of the second to the tenth embodiments, wherein the vanadium oxide secondary particles have a specific surface area of 0.1 $m^2/g$-10 $m^2/g$.

According to a twelfth embodiment, there is provided the lithium ion secondary battery of any one of the first to the eleventh embodiments, wherein the non-aqueous solvent includes DME in an amount of 40 wt % or more based on the total weight of the non-aqueous solvent.

According to a thirteenth embodiment, there is provided the lithium ion secondary battery of any one of the first to the twelfth embodiments, wherein the non-aqueous solvent further includes at least one selected from the group consisting of carbonate-based solvents, ester-based solvents, ketone-based solvents, alcohol-based solvents and aprotic solvents.

According to a fourteenth embodiment, there is provided the lithium ion secondary battery of any one of the first to the thirteenth embodiments, wherein the electrolyte includes, as a lithium salt, at least one selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein each of x and y represents a natural number), LiCl, LiI and $LiB(C_2O_4)_2$ (lithium bis(oxalato) borate; LiBOB).

Advantageous Effects

The lithium ion secondary battery according to the present disclosure uses a vanadium oxide as a positive electrode active material and shows little dissolution of vanadium in the electrolyte, and thus provides high capacity maintenance and excellent life characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
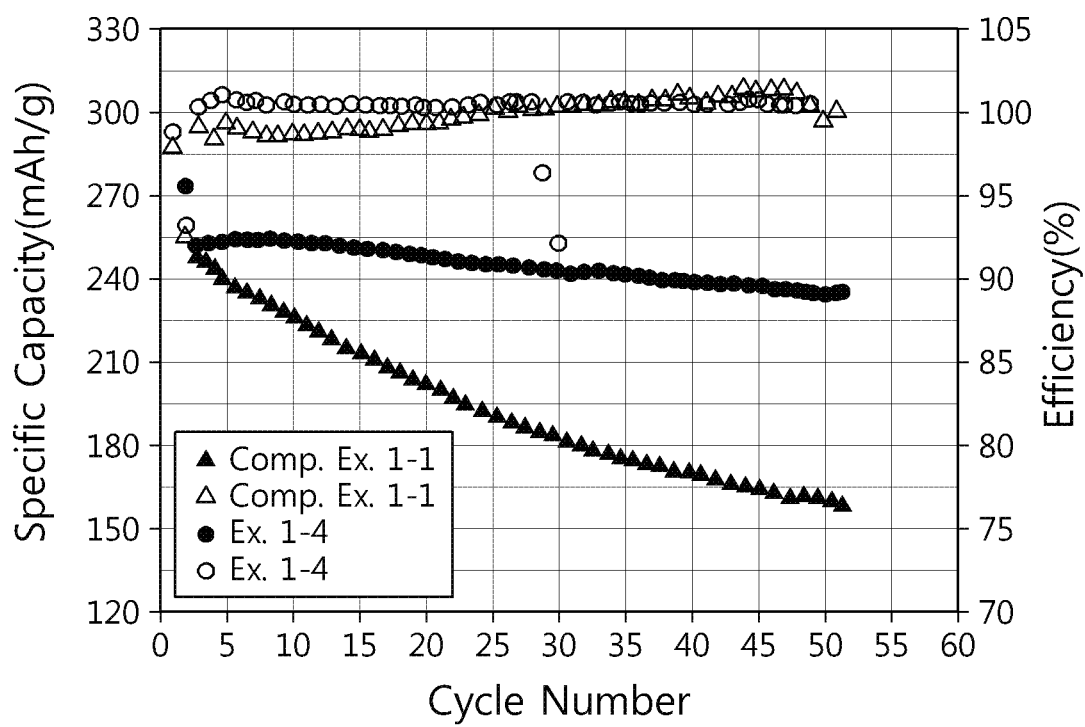
FIG. 1 is a graph illustrating the test results of life characteristics and capacity maintenance of the batteries according to Example 1-4 and Comparative Example 1-1.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is linked to another portion' includes not only 'one portion is linked directly to another portion' but also 'one portion is linked electrically to another portion with the other portion interposed between them'.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect, there is provided a lithium ion secondary battery which includes a vanadium oxide as a positive electrode active material.

According to an embodiment of the present disclosure, the battery includes an electrode assembly and an electrolyte, which are enclosed and sealed in a suitable battery casing, such as a pouch-type casing material or metallic can.

According to an embodiment of the present disclosure, the electrode assembly includes a positive electrode(cathode), a negative electrode(anode) and a separator interposed between the positive electrode and the negative electrode. In addition, according to the present disclosure, the positive electrode includes a current collector and a positive electrode active material layer formed on at least one surface of the current collector.

The current collector is not particularly limited, as long as it has conductivity while not causing any chemical change in the battery. Particular examples of the current collector that may be used include copper, stainless steel, aluminum, nickel, titanium, baked carbon, copper or stainless steel surface-treated with carbon, nickel, titanium, silver, etc., aluminum-cadmium alloy, or the like.

The positive electrode active material layer includes a positive electrode active material, a conductive material and a binder resin.

According to the present disclosure, the positive electrode active material includes a vanadium oxide. A vanadium oxide is a material having a higher voltage, higher energy density and a broader reversible insertion region as compared to the other inorganic compounds, such as $Al_2O_3$, MgO and $SiO_2$. Thus, when a vanadium oxide is included in a positive electrode active material, intercalation and diffusion of lithium ions may be facilitated, resulting in improvement of the capacity and output of a lithium secondary battery. According to the present disclosure, the vanadium oxide may be $V_aO_b$ (wherein $1 \le a \le 6$ and $2 \le b \le 13$) and particular examples thereof may include $VO_2$, $V_2O_5$, $V_3O_7$, $V_6O_{13}$ or a combination thereof. According to an embodiment of the present disclosure, the vanadium oxide includes $V_2O_5$ with a view to the capacity and life characteristics of a battery.

According to the present disclosure, the vanadium oxide may include primary particles (and/or primary particle shapes) and/or secondary particles (and/or secondary particle shapes). According to an embodiment of the present disclosure, the vanadium oxide includes secondary particles (and/or secondary particle shapes) formed by assemblage of primary particles (and/or primary particle shapes). According to an embodiment of the present disclosure, the vanadium oxide contained in the positive electrode active material may be present as non-aggregated free primary particles (and/or primary particle shapes) in a small amount.

According to the present disclosure, the primary particles and/or secondary particles have a spherical or pseudo-spherical shape. As used herein, 'pseudo-spherical shape' has a three-dimensional volume including an elliptical shape and covers any shapes of particles whose shapes cannot be specified, such as amorphous particles.

According to the present disclosure, the vanadium oxide primary particles have a lowest particle diameter ($D_{50}$) of 10 nm or more, 50 nm or more, 100 nm or more, or 200 nm or more. In addition, the vanadium oxide primary particles have a highest particle diameter ($D_{50}$) of 1 μm or less, 0.9 μm or less, or 0.5 μm or less. When the particle diameter of the vanadium oxide primary particles is lower than the above-defined range, the specific surface area is increased excessively, resulting in an increase in side reaction with the electrolyte. When the particle diameter of the vanadium oxide primary particles is excessively higher than the above-defined range, the ion conductivity may be decreased.

In addition, according to the present disclosure, the vanadium oxide secondary particles have a specific surface area of $0.1 \text{ m}^2/\text{g}$-$10 \text{ m}^2/\text{g}$. Within the above-defined range, the vanadium oxide secondary particles may have a specific surface area of $0.1 \text{ m}^2/\text{g}$ or more, $0.5 \text{ m}^2/\text{g}$ or more, $1 \text{ m}^2/\text{g}$ or more, or $2 \text{ m}^2/\text{g}$ or more, and $10 \text{ m}^2/\text{g}$ or less, $8 \text{ m}^2/\text{g}$ or less, or $6 \text{ m}^2/\text{g}$ or less. When the specific surface area of the vanadium oxide secondary particles is higher than the above-defined range, the specific surface area is increased excessively, resulting in an increase in side reaction with the electrolyte. When the specific surface area of the vanadium secondary particles is excessively lower than the above-defined range, the ion conductivity may be decreased. According to the present disclosure, measurement of the specific surface area of the secondary particles is not particularly limited but may be carried out by the Brunauer-Emmett-Teller (BET) method. Particularly, a porosimetry analyzer (Bell Japan Inc., Belsorp-II mini) may be used to determine the specific surface area by the BET 6-dot method through nitrogen gas adsorption flowmetry. In addition, the vanadium oxide secondary particles have a porosity of 0.1%-20%. Within the above-defined range, the secondary particles may have a porosity of 0.1% or more, 0.5% or more, 1% or more, or 2% or more, and 35% or less, 30% or less, or 20% or less. When the porosity of the vanadium oxide secondary particles is lower than the above-defined range, impregnability with the electrolyte may be degraded. When the porosity is increased excessively, energy density may be decreased. Measurement of the porosity is not particularly limited. For example, measurement of the porosity may be carried out by using an adsorption gas, such as nitrogen, and a BET system (BELSORP available from BEL JAPAN Inc.)

Meanwhile, the vanadium oxide secondary particles have a particle diameter ($D_{50}$) of 500 nm-50 μm. According to an embodiment of the present disclosure, the particle diameter may be 500 nm or more, 700 nm or more, 1 μm or more, 2 μm or more, or 5 μm or more, and 50 μm or less, 30 μm or less, 20 μm or less, 10 μm or less, or 5 μm or less. When the vanadium oxide secondary particles have a particle diameter within the above-defined range, processability may be improved during the manufacture of an electrode. When the particle diameter is excessively lower than the above-defined range, use of a binder and solvent may be increased. When the particle diameter is excessively higher than the above-defined range, processability may be degraded.

The particle diameter ($D_{50}$) means the particle size ($D_{50}$) of 50% of the integrated value from a smaller particle diameter calculated based on the results of measurement of particle size distribution of the particles after the classification thereof using a conventional particle size distribution measuring system. Such particle size distribution can be determined by an intensity pattern of diffraction or scattering, and by means of a particle size distribution measuring system, such as Microtrack 9220FRA or Microtrack HRA available from Nikkiso, Inc.

Meanwhile, when the size and distribution of the pores in the secondary particles are non-uniform, excess or deficiency of an electrolyte or non-uniform availability of an active material may be generated. Considering these, the vanadium oxide secondary particles according to the present disclosure include mesopores having a longer diameter of 0.1 μm or more in an amount of 10 vol %-50 vol % based on 100 vol % of the pores formed inside of and on the surface of the particle bodies. When the volume of the mesopores is lower than the above-defined range, the pore volume becomes excessively small, thereby making it difficult to conduct ions and/or electrons and causing a decrease in efficiency of impregnation with an electrolyte. On the contrary, when the volume of the mesopores is excessively higher than the above-defined range, porosity is increased excessively, resulting in degradation of energy density and output characteristics.

As used herein, the term 'primary particle shape' refers to a shape in which particles are present individually and are aggregated merely by several particles, even if aggregation occurs. The term 'secondary particle shape' refers to a particle shape like a bunch of grapes formed by aggregation of a number of smaller primary particles.

As used herein, the term 'porosity' means a ratio of the volume occupied by pores based on the volume of particles, is expressed by a unit of %, and may be exchanged with the terms 'pore ratio', 'porous degree', or the like.

In addition, according to the present disclosure, the particle diameter ($D_{50}$) means the particle size ($D_{50}$) of 50% of the integrated value from a smaller particle diameter calculated based on the results of measurement of particle size distribution of the particles after the classification thereof using a conventional particle size distribution measuring system.

In the positive electrode active material layer, the content of vanadium oxide is 50 wt % or more based on the total weight of the positive electrode active material contained in the positive electrode active material layer. When the content of vanadium oxide is within the above-defined range, it is possible to obtain an effect of increasing capacity and life more adequately. In addition, the content of vanadium oxide secondary particles in the vanadium oxide may be 70 wt % or more, 90 wt % or more, 95 wt % or more, or 99 wt % or more, based on the total weight of the vanadium oxide. In addition, the upper limit of the content of vanadium oxide is 100 wt %, 99 wt %, 95 wt %, or 90 wt %.

When using such porous vanadium oxide secondary particles for a positive electrode, it is possible to reduce lithium diffusion resistance, and thus to improve rate characteristics of a battery and to improve the life of a battery significantly.

Hereinafter, the method for preparing a vanadium oxide will be explained. The vanadium oxide secondary particles may be obtained by preparing primary particles and assembling the primary particles to prepare secondary particles.

The method for preparing the vanadium oxide primary particles is not particularly limited. For example, a solid phase process, co-precipitation process, hydrothermal process, supercritical hydrothermal process, etc. may be used.

According to an embodiment of the method for preparing primary particles, a vanadium oxide precursor and an organic acid are introduced to distilled water to form a precursor solution, first. The organic acid that may be used herein includes at least one selected from the group consisting of citric acid, gallic acid, tannic acid, oxalic acid, ferulic acid, vanillic acid and protocatechuic acid, but is not limited thereto. The vanadium oxide precursor that may be used herein includes at least one selected from $NH_4VO_3$, vanadyl acetylacetonate $[VO(C_5H_7O_2)_2]$, $V_2O_5$ and vanadyl triisopropoxide $[VO(O-Pri)_3]$, but is not limited thereto. The precursor solution may be agitated for 0.5 hr-3 hr to form a homogeneously dispersed phase.

Next, the precursor solution is spray dried and heat treated to obtain vanadium oxide formed by assemblage of vanadium oxide primary particles. According to an embodiment of the present disclosure, a spray drying process, such as a rotary spray drying process, shows an effect of forming spherical secondary particles and increasing bulk density.

The spray drying process will be explained in detail. The precursor solution (spraying solution) obtained from the preceding step is supplied to a spraying chamber and the spraying solution is spray dried in the chamber. According to an embodiment of the present disclosure, the spraying solution is sprayed through a disk rotating at a high speed in the chamber, wherein the spraying and drying may be carried out in the same chamber. According to an embodiment of the present disclosure, the spraying solution may be supplied at a rate of 20 kg/hr-50 kg/hr. According to an embodiment of the present disclosure, the spray drying temperature may be set adequately to control the size of the cavities of secondary particles. For example, the spray drying may be carried out at a temperature of 20° C.-350° C. for about 4 minutes-20 minutes.

Through the spray drying, secondary particles formed by assemblage of primary particles are obtained. Then, the secondary particles are sintered by heat treating them at a temperature of about 300° C.-700° C. The heat treatment is carried out in the air for about 1-10 hours. After the sintering, a vanadium oxide is obtained finally.

Optionally, a washing process may be further carried out after primary particles are obtained and before secondary particles are prepared in order to remove salt impurities, ionic impurities, etc. that may remain in the primary particles.

Although vanadium oxide secondary particles can be obtained by the above-described method, the method for preparing vanadium oxide secondary particles is not particularly limited, and any method for preparing vanadium oxide secondary particles having the above-mentioned characteristics may be used with no particular limitation.

According to an embodiment of the present disclosure, the positive electrode active material layer may further include the following positive active material in combination with the vanadium oxide having the above-mentioned characteristics. Such a positive electrode active material may include at least one selected from: lithium nickel manganese composite oxides (LNMO) represented by the chemical formula of $LiM_yO_2$ (wherein M is $M'_{1-k}A_k$, M' is $Ni_{1-a-b}(N_{1/2}Mn_{1/2})_aCo_b$, $0.65 \leq a+b \leq 0.85$ and $0.1 \leq b \leq 0.4$. In addition, $0 \leq k \leq 0.05$ and $x+y=2$, wherein $0.95 \leq y \leq 1.05$); layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0 to 0.33), $LiMnO_3$, $LiMn_2O_3$ and $LiMnO_2$; lithium manganese composite oxides represented by the chemical formula of $Li_2Mn_3MO_8$ (wherein M=Fe, Co, Ni, Cu or Zn); $LiMn_2O_4$ in which Li is partially substituted with alkaline earth metal ions; disulfide compounds; and $Fe_2(MoO_4)_3$, or lithium iron phosphate compounds ($LiFePO_4$) represented by the chemical formula of $Li_{1-a}Fe_{1-x}M_x(PO_{4-b})X_b$ (wherein a is −0.5 to 0.5, x is 0 to 0.5, and b is 0 to 0.1).

The conductive material is used to impart conductivity to an electrode. Any conductive material may be used, as long as it is an electro-conductive material and causes no chemical change. Typical examples of the conductive material include: carbonaceous materials, such as natural graphite, artificial graphite carbon black, acetylene black, ketjen black or carbon fibers or metal fibers; metallic powder, such as copper, nickel, aluminum or silver, or metallic materials, such as metallic fibers; conductive polymers, such as polyphenylene derivatives; or conductive materials including a mixture thereof.

The binder functions to attach positive electrode active material particles to each other and to attach the positive electrode active material to a current collector. Typical examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-containing polymers, polyvinyl pyrrolidone, polyurethane, polytetrafluoroethylene, polyvinylidene fluoride, polyethylene, polypropylene, styrene butyrene rubber, acrylated styrene-butadiene rubber, epoxy resins, nylon, or the like, but are not limited thereto.

According to the present disclosure, the negative electrode includes a current collector and a negative electrode active material layer formed on at least one surface of the current collector.

The negative electrode current collector that may be used herein include platinum (Pt), gold (Au), palladium (Pd), iridium (Ir), silver (Ag), ruthenium (Ru), nickel (Ni), stainless steel (STS), copper (Cu), molybdenum (Mo), chromium (Cr), carbon (C), titanium (Ti), tungsten (W), indium tin oxide (ITO, In doped $SnO_2$), fluorine tine oxide (FTO, F doped $SnO_2$) and alloys thereof, and copper (Cu) or stainless steel surface treated with carbon (C), nickel (Ni), titanium (Ti) or silver (Ag), but is not limited thereto. The negative electrode current collector may have various shapes, such as a film, sheet, foil, net, porous body, foam, and non-woven body.

In addition, according to the present disclosure, the negative electrode active material layer includes a negative electrode active material, a conductive material and a binder resin.

The negative electrode active material may include at least one selected from at least one of alkali metals, alkaline earth metals, Group 3B metals and transition metals, and alloys of at least one of the metals with another metal(s). Non-limiting examples of the metal may include lithium (Li), sodium (Na), potassium (K), rubidium (Rb), cesium (Cs) or francium (Fr), aluminum (Al), gallium (Ga), or the like. According to an embodiment of the present disclosure, the negative electrode active material may include at least one of lithium metal and lithium alloys (e.g. alloys of lithium with at least one metal selected from aluminum, zinc, bismuth, cadmium, silicon, lead, tin, gallium and indium). According to an embodiment of the present disclosure, the negative electrode active material may have a shape of metal foil and/or metal powder, and the negative electrode may be obtained by coating, binding, rolling or depositing metal foil and/or metal powder onto a flat current collector. Otherwise, the negative electrode may include metal foil without any current collector. According to an embodiment of the present disclosure, the negative electrode may be obtained by physically binding or rolling the above mentioned metals and/or alloy to the negative electrode current collector, or by carrying out electrodeposition or chemical vapor deposition of the metals and/or alloys on the current collector.

The conductive material and binder resin contained in the negative electrode active material layer are not particularly limited, as long as they may be used for a negative electrode for an electrochemical device. The same as described with reference to the positive electrode active material layer may be applied to the conductive material and binder resin for the negative electrode active material layer.

According to the present disclosure, the separator is not particularly limited, as long as it can be used as a separator material for a conventional electrochemical device. Particular examples of the separator include porous polymer films or non-woven webs including at least one polymer resin selected from polyolefin, polyethylene terephthalate, polybutylene terephthalate, polyacetal, polyamide, polycarbonate, polyimide, polyether ether ketone, polyether sulfone, polyphenylene oxide, polyphenylene sulfide and polyethylene naphthalene. According to an embodiment of the present disclosure, the separator may be a stacked separator including two or more different substrates stacked successively.

According to an embodiment of the present disclosure, the separator may have a heat resistant layer containing inorganic particles and a binder resin on at least one surface thereof. Reference can be made by the disclosure of Korean Patent Laid-Open No. 10-2007-0019958 about the heat resistant layer.

According to the present disclosure, each of the positive electrode and the negative electrode can be obtained by mixing and agitating an electrode mixture containing an electrode active material, a conductive material and a binder with a suitable solvent, such as NMP, acetone or water, applying the mixture to the current collector and carrying out pressurization. However, the method for manufacturing an electrode is not limited to the above-mentioned method. Various methods may be used with no particular limitation, as long as they can provide electrodes having the above-described characteristics.

After the positive electrode, negative electrode and the separator are prepared as described above, the separator is interposed between the positive electrode and the negative electrode to form an electrode assembly, which, in turn, is introduced to a suitable battery casing, and then an electrolyte is injected thereto to obtain a battery. The shape of the electrode assembly may be selected suitably depending on purpose of use or particular use of a battery. For example, the electrode assembly may have various shapes, such as a stacked-folded shape, stacked shape and a wound shape.

According to the present disclosure, the electrolyte includes a non-aqueous solvent and a lithium salt. According to an embodiment of the present disclosure, the non-aqueous solvent may include ethylene glycol dimethyl ether (DME). It is preferred that the non-aqueous solvent includes DME in an amount of 40-100 wt % based on the total weight of the non-aqueous solvent.

In addition, the non-aqueous solvent may further include at least one selected from carbonate-based, ester-based, ether-based, ketone-based, alcohol-based and aprotic solvents, besides DME. Particular examples of the carbonate-based solvents include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), or the like. Particular examples of the ester-based solvents include methyl acetate, ethyl acetate, n-propyl acetate, dimethyl acetate, methyl propionate, ethyl propionate, γ-butyrolactone, decanolide, valerolactone, mevalonolactone, caprolactone, or the like. Particular examples of the ether-based solvents include dibutyl ether, teraglyme, diglyme, dimethoxyethane, 2-methyltetrahydrofuran, tetrahydrofuran, or the like. Particular examples of the ketone-based solvents include cyclohexanone, or the like. Particular examples of the alcohol-based solvents include ethyl alcohol, isopropyl alcohol, or the like. Particular examples of the aprotic solvents include nitriles such as R—CN (wherein R is a C2-C20 linear, branched or cyclic hydrocarbon group which may include a double bonded aromatic ring or ether bond), amides such as dimethyl formamide, dioxolanes such as 1,3-dioxolane, sulfolanes, or the like. According to an embodiment of the present disclosure, the electrolyte may further include 1,3-dioxolane (DOL) and/or 1,2-dimethoxyethane (EGDME) in combination with DME.

The lithium salt is a material which is dissolved in the organic solvent, functions as a lithium ion source in a battery to allow basic operation of the lithium secondary battery, and accelerates transport of lithium ions between the positive electrode and the negative electrode. According to the present disclosure, the lithium salt is used at a concentration of 0.5 mol/L-7 mol/L in the electrolyte. According to an embodiment, the concentration of the lithium salt in the electrolyte may be 0.5 mol/L or more, 1 mol/L or more, 2 mol/L or more, 3 mol/L or more, 4 mol/L or more, 5 mol/L or more, or 6 mol/L or more, and 6 mol/L or less, 5 mol/L or less, 4 mol/L or less, 3 mol/L or less, 2 mol/L or less, or 1 mol/L or less. According to an embodiment of the present disclosure, the concentration of the lithium salt in the electrolyte is 0.5 mol/L-4 mol/L. In addition, according to an embodiment of the present disclosure, the concentration of the lithium salt in the electrolyte is 4 mol/L-7 mol/L. When the concentration of the lithium salt is within the above-defined range, the electrolyte may have an adequate level of conductivity and viscosity, and thus can provide excellent properties as an electrolyte and can allow effective transport of lithium ions. As the concentration of the lithium salt is increased, the initial capacity of a battery is increased (see, FIG. 3 and Table 3). Meanwhile, according to an embodiment of the present disclosure, the lithium salt includes lithium bis(fluorosulfonyl)imide) (LiFSI), and LiFSI is present in an amount of 50 wt %-100 wt % based on the total weight of lithium salt contained in the electrolyte.

In addition, the electrolyte may further include, as a lithium salt, at least one salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein each of x and y is a natural number), LiCl, LiI and lithium bis(oxalato) borate (LiBOB; $LiB(C_2O_4)_2$), besides LiFSI.

As described above, the lithium ion secondary battery according to the present disclosure uses a vanadium oxide as a positive electrode active material, wherein the electrolyte includes ethylene glycol dimethyl ether (DME) and lithium bis(fluorosulfonyl)imide (LiFSI). When the vanadium oxide is used as a positive electrode active material, dissolution of vanadium is reduced by virtue of the above-mentioned composition of the electrolyte, and thus provides an effect of improving the capacity maintenance and life characteristics of the battery significantly. Particularly, when the vanadium oxide includes secondary particles, the effect of reducing dissolution of vanadium is further improved. In another aspect, there is provided a battery module including the secondary battery as a unit cell, a battery pack including the battery module, and a device including the battery pack as a power source.

Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

The present disclosure will be described more fully hereinafter with reference to examples. The following examples may, however, be provided for illustrative purposes only and the scope of the present disclosure is not limited thereto.

1. Example 1 (Examples 1-1 to 1-4)

1) Manufacture of Positive Electrode $V_2O_5$ powder (Shino Chemical, purity 99%) was used as a positive electrode active material. $V_2O_5$ powder was pulverized by using a mortar to a particle diameter ($D_{50}$) of primary particles of about 500 nm. The prepared $V_2O_5$ powder, a conductive material (Super-C) and a binder (PVdF) were mixed at a weight ratio of 8:1:1 in N-methyl-2-pyrrolidone (NMP) to obtain a positive electrode mixture. Then, the positive electrode mixture was coated on aluminum foil having a thickness of 20 μm as a positive electrode current collector to a thickness of 60 μm, followed by rolling and drying, to obtain a positive electrode.

2) Manufacture of Negative Electrode

Lithium metal foil (thickness 160 m) was used as a negative electrode.

3) Manufacture of Secondary Battery

A separator (separator made of polyethylene: thickness 20 m) was interposed between the positive electrode and the negative electrode to obtain an electrode assembly. The electrode assembly is received in a pouch-type battery casing and an electrolyte was injected thereto to obtain a coin-type secondary battery. The electrolyte used for each Example is shown in the following Table 1.

TABLE 1

|  | Non-aqueous solvent | Lithium salt/concentration |
| --- | --- | --- |
| Example 1-1 | DME | LFSI(1 mol/L) |
| Example 1-2 | DME | LFSI(3 mol/L) |
| Example 1-3 | DME | LFSI(6 mol/L) |
| Example 1-4 | DME | LFSI(4 mol/L) |

2. Comparative Example 1 (Comparative Examples 1-1 to 1-3)

1) Manufacture of Positive Electrode $V_2O_5$ powder (Shino Chemical, purity 99%) was used as a positive electrode active material. $V_2O_5$ powder was pulverized by using a mortar to a particle diameter ($D_{50}$) of primary particles of about 500 nm. The prepared $V_2O_5$ powder, a conductive material (Super-C) and a binder (PVdF) were mixed at a weight ratio of 8:1:1 in N-methyl-2-pyrrolidone (NMP) to obtain a positive electrode mixture. Then, the positive electrode mixture was coated on aluminum foil having a thickness of 20 μm as a positive electrode current collector to a thickness of 60 μm, followed by rolling and drying, to obtain a positive electrode.

2) Manufacture of Negative Electrode

Lithium metal foil (thickness 160 μm) was used as a negative electrode.

3) Manufacture of Secondary Battery

A separator (separator made of polyethylene: thickness 20 μm) was interposed between the positive electrode and the negative electrode to obtain an electrode assembly. The electrode assembly is received in a pouch-type battery casing and an electrolyte was injected thereto to obtain a coin-type secondary battery. The electrolyte used for each Comparative Example is shown in the following Table 2.

TABLE 2

|  | Non-aqueous solvent | Lithium salt/concentration |
| --- | --- | --- |
| Comparative Example 1-1 | EC/DMC(1:1 volume ratio) | $LiPF_6$(1 mol/L) |
| Comparative Example 1-2 | EC/DMC(1:1 volume ratio) | LiFSI(1 mol/L) |
| Comparative Example 1-3 | EC/DMC(1:1 volume ratio) | $LiClO_4$(1 mol/L) |

*EC: ethylene carbonate
*DMC: dimethylcarbonate

3. Evaluation of Characteristics of Battery (1) Life Characteristics and Capacity Maintenance Each of the batteries obtained from Examples 1-1 to 1-4 and Comparative Examples 1-1 to 1-3 was used to evaluate the capacity maintenance and life characteristics. Each battery was charged to 4.0V under a constant current condition of 0.1 C and discharged under the constant current condition to 2.1V at the first cycle, and then subjected to constant-current charging to 4.0V at 0.5 C and constant-current discharging to 2.1V during the second cycle to the fiftieth cycle in order to determine the life characteristics and capacity maintenance. According to the present disclosure, capacity maintenance is defined by the following Mathematical Formula 1 and initial charge/discharge efficiency is defined by the following Mathematical Formula 2:

Capacity Maintenance (%)=[discharge capacity at the fiftieth cycle/discharge capacity at the second cycle]×100  [Mathematic Formula 1]

Initial Charge/Discharge Efficiency (%)=[discharge capacity at the first cycle/charge capacity at the first cycle]×100  [Mathematical Formula 2]

FIG. 1 is a graph illustrating the test results of life characteristics and capacity maintenance of the batteries according to Example 1-4 and Comparative Example 1-1. It can be seen that the battery according to Example 1-4 shows an insignificant decrease in capacity maintenance during the fifty charge/discharge cycles as compared to the battery according to Comparative Example 1-1. It is shown that the battery according to Comparative Example 1-1 has a capacity decreased by 50% or more after the 25$^{th}$ cycle as compared to the initial capacity.

Figure 2:
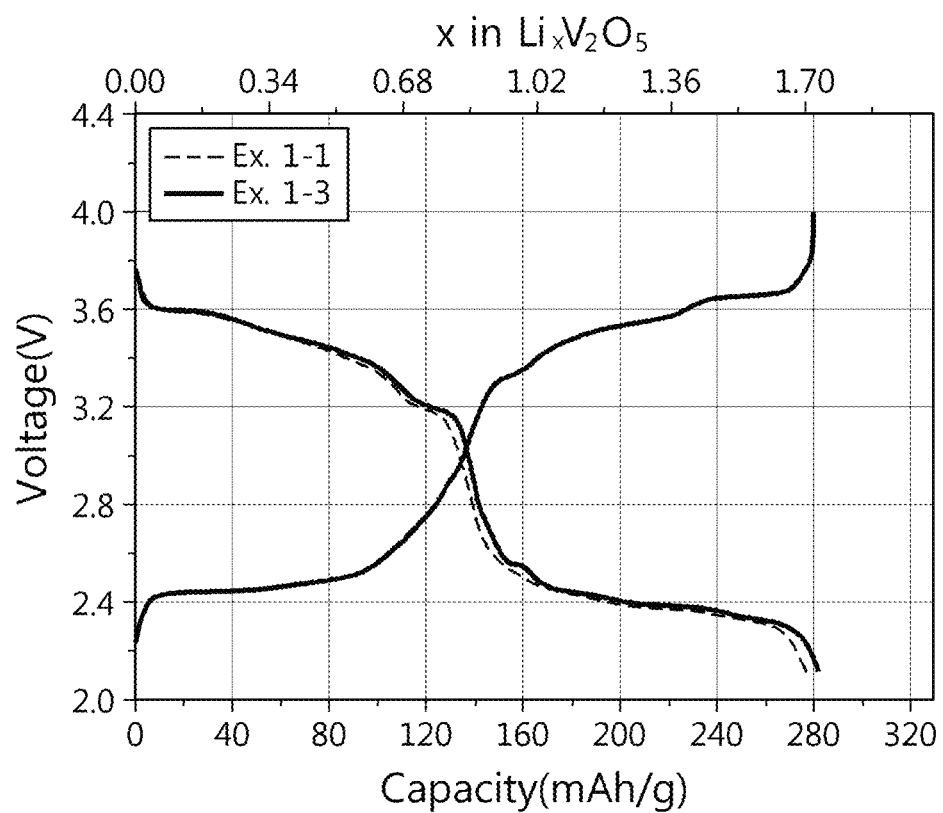
FIG. 2 is a graph illustrating the charge/discharge profiles of the batteries according to Example 1-1 and Example 1-3 in comparison with each other.
Figure 3:
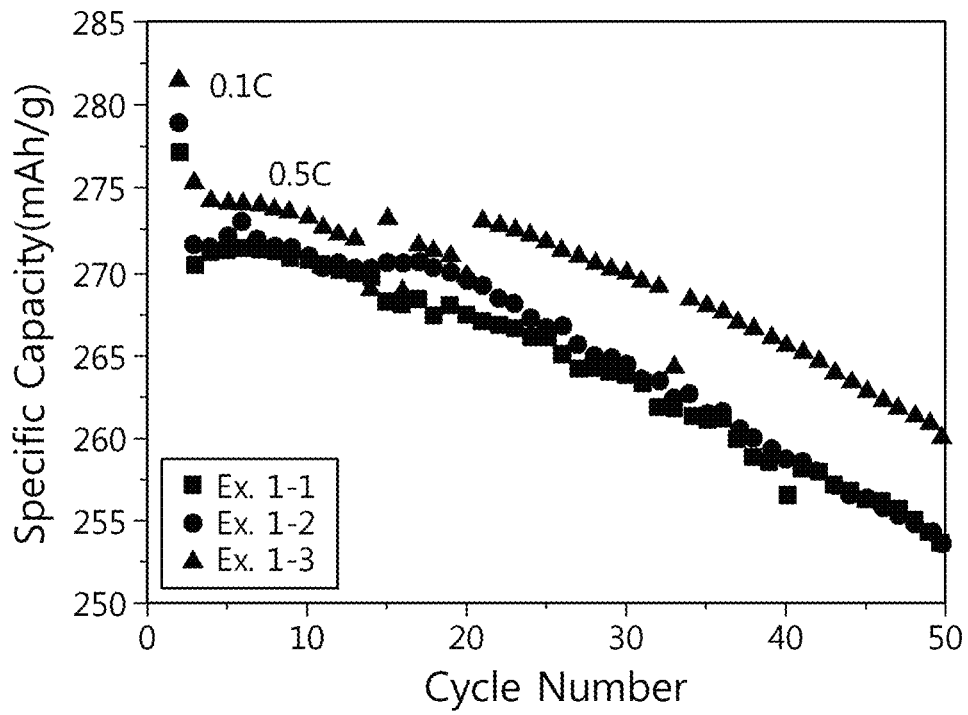
FIG. 3 is a graph illustrating the capacity maintenance of each of the batteries according to Examples 1-1 to 1-3.

FIG. 2 is a graph illustrating the charge/discharge profiles of the batteries according to Example 1-1 and Example 1-3 in comparison with each other, and FIG. 3 is a graph illustrating the capacity maintenance of each of the batteries according to Examples 1-1 to 1-3. It can be seen that the battery having a higher concentration of lithium salt according to Example 1-3 shows a decrease in over-voltage as compared to the batteries according to Examples 1-1 and 1-2. Meanwhile, the following Table 3 shows the battery capacity (after the first cycle and the second cycle) of each of the batteries according to Examples 1-1 to 1-3.

TABLE 3

|  | 1$^{st}$ cycle (0.1 C) (mAh/g) | 2$^{nd}$ cycle (0.5 C) (mAh/g) |
| --- | --- | --- |
| Example 1-1 | 276.9 | 270.2 |
| Example 1-2 | 278.8 | 271.4 |
| Example 1-3 | 281.3 | 275.1 |

Figure 4:
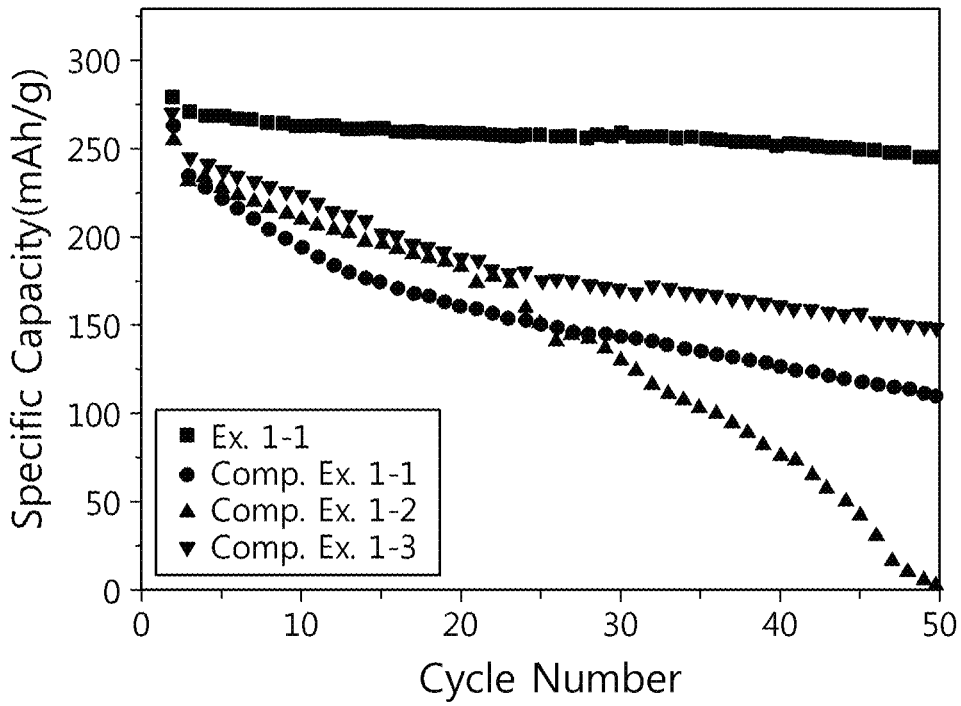
FIG. 4 is a graph illustrating the test results of life characteristics and capacity maintenance of the batteries according to Example 1-1 and Comparative Examples 1-1 to 1-3.

FIG. 4 is a graph illustrating the test results of life characteristics and capacity maintenance of the batteries according to Example 1-1 and Comparative Examples 1-1 to 1-3. It can be seen that the battery according to Example 1-1 shows an insignificant decrease in capacity maintenance during the fifty charge/discharge cycles as compared to the batteries according to Comparative Example 1-1 to 1-3. Particularly, the battery according to Comparative Example 1-2 using the same salt as Examples shows a rapid decrease in life characteristics as compared to the batteries according to Examples.

(2) Comparison of Vanadium Dissolution

The battery according to Example 1-4 was compared with the battery according to Comparative Example 1-1 in terms of vanadium dissolution. Each battery was broken after the charge/discharge test of the 50$^{th}$ cycle and the amount of vanadium present in the separator and the negative electrode was measured by using inductively coupled plasma (ICP). The results are shown in the following Table 4.

TABLE 4

|  | Dissolution (wt %) (separator and negative electrode after 50 cycles) |
| --- | --- |
| Example 1-4 | 7.5 |
| Comparative Example 1-1 | 25.7 |

The electrolyte using a combination of EC/DMC according to Comparative Example 1-1 causes degradation of life characteristics regardless of the type of lithium salt. On the contrary, Examples using DME as an electrolyte shows decreased vanadium dissolution and significantly improved life characteristics. Therefore, it can be seen that use of DME in combination with use of LiFSI as a lithium salt provides significantly improved initial capacity as the content of lithium salt is increased.

4. Example 2

(1) Example 2-1

Figure 5:
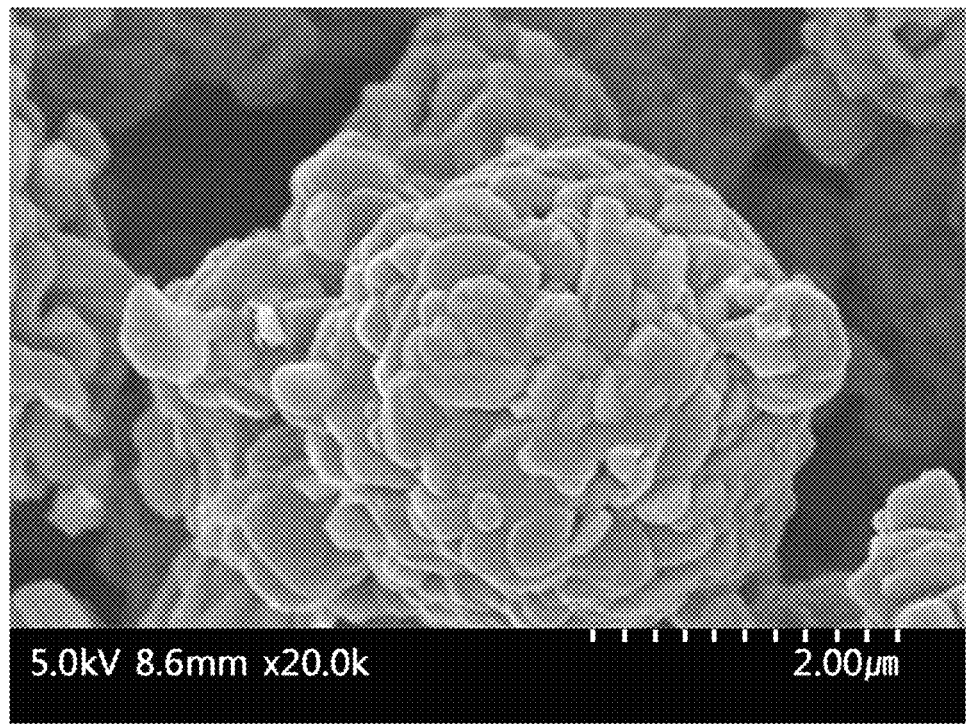
FIG. 5 shows a scanning electron microscopic (SEM) image of the $V_2O_5$ secondary particles according to the present disclosure.
Figure 6:
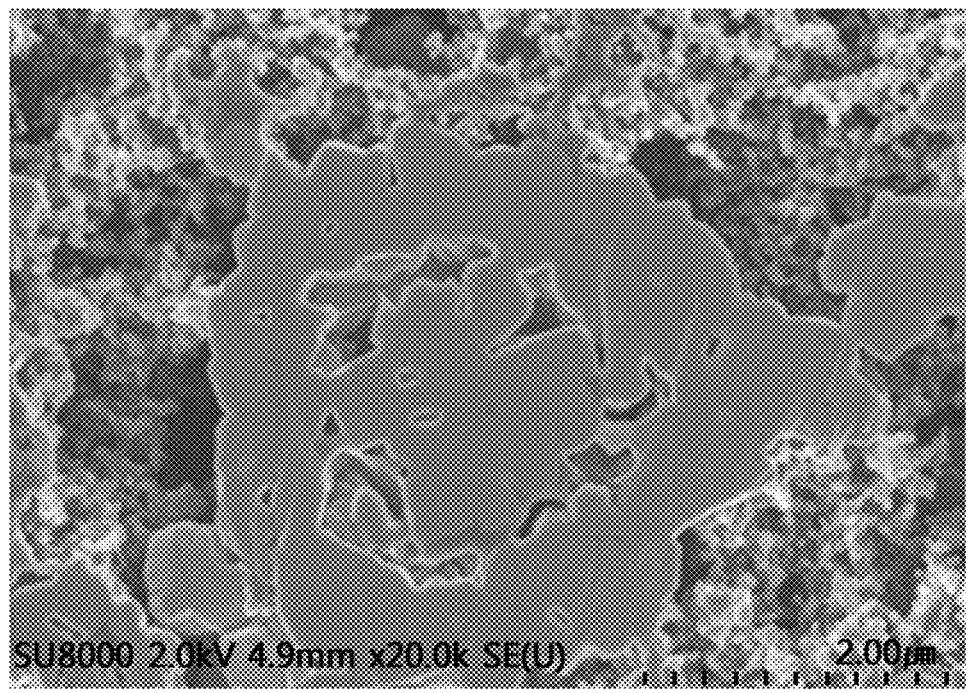
FIG. 6 shows a SEM image of the sectional surface of the $V_2O_5$ secondary particles according to the present disclosure.

1) Preparation of Positive Electrode Active Material $NH_4VO_3$ and citric acid were introduced to distilled water to provide a precursor solution (citric acid:$NH_4VO_3$:$H_2O$=1:1:30 weight ratio). The precursor solution was agitated for about 1 hour to obtain a homogeneous phase. Next, the precursor solution was spray dried. The inlet temperature of the chamber was about 180° C. and the outlet temperature thereof was about 110° C. (measured value). The particles obtained by spray drying were heat treated at about 500° C. to obtain $V_2O_5$ secondary particles formed by assemblage of vanadium oxide primary particles. The obtained secondary particles had a particle diameter ($D_{50}$) of 5 μm, a specific surface area of 1.8 m$^2$/g and a porosity of 7%. FIG. 5 shows a scanning electron microscopic (SEM) image of the $V_2O_5$ secondary particles obtained as described above. It can be seen that pores are formed inside of the bodies of the secondary particles formed by assemblage of the primary particles.

2) Manufacture of Positive Electrode.

The $V_2O_5$ powder obtained from Preparation Example 1 was used. The prepared $V_2O_5$ powder, a conductive material (Super-C) and a binder (PVdF) were mixed at a weight ratio of 8:1:1 in N-methyl-2-pyrrolidone (NMP) to obtain a positive electrode mixture. Then, the positive electrode mixture was coated on aluminum foil having a thickness of 20 μm as a positive electrode current collector to a thickness of 60 μm, followed by rolling and drying, to obtain a positive electrode.

2) Manufacture of Negative Electrode

Lithium metal foil (thickness 160 μm) was used as a negative electrode.

3) Manufacture of Secondary Battery

A separator (PE separator, 20 μm) was interposed between the positive electrode and the negative electrode to obtain an electrode assembly. The electrode assembly is received in a pouch-type battery casing and an electrolyte was injected thereto to obtain a coin-type secondary battery. DME was used as a non-aqueous solvent for the electrolyte used in this Example and LiFSI was used as a lithium salt. The concentration of the lithium salt in the electrolyte was 4 mol/L.

(2) Example 2-2

1) Manufacture of Positive Electrode $V_2O_5$ powder (Shino Chemical, purity 99%) was used as a positive electrode active material. $V_2O_5$ powder was pulverized by using a mortar to a particle diameter ($D_{50}$) of primary particles of about 500 nm. The prepared $V_2O_5$ powder, a conductive material (Super-C) and a binder (PVdF) were mixed at a weight ratio of 8:1:1 in N-methyl-2-pyrrolidone (NMP) to obtain a positive electrode mixture. Then, the positive electrode mixture was coated on aluminum foil having a thickness of 20 μm as a positive electrode current collector to a thickness of 60 μm, followed by rolling and drying, to obtain a positive electrode.

2) Manufacture of Negative Electrode

Lithium metal foil (thickness 160 μm) was used as a negative electrode.

3) Manufacture of Secondary Battery

A separator (polyethylene, 20 μm) was interposed between the positive electrode and the negative electrode to obtain an electrode assembly. The electrode assembly and the electrolyte were used to obtain a coin cell-type secondary battery. DME was used as a non-aqueous solvent for the electrolyte used in this Example and LiFSI was used as a lithium salt. The concentration of the lithium salt in the electrolyte was 4 mol/L.

5. Comparative Example 2-1

1) Manufacture of Positive Electrode $V_2O_5$ powder (Shino Chemical, purity 99%) was used as a positive electrode active material. $V_2O_5$ powder was pulverized by using a mortar to a particle diameter ($D_{50}$) of primary particles of about 500 nm. The prepared $V_2O_5$ powder, a conductive material (Super-C) and a binder (PVdF) were mixed at a weight ratio of 8:1:1 in N-methyl-2-pyrrolidone (NMP) to obtain a positive electrode mixture. Then, the positive electrode mixture was coated on aluminum foil having a thickness of 20 μm as a positive electrode current collector to a thickness of 60 μm, followed by rolling and drying, to obtain a positive electrode.

2) Manufacture of Negative Electrode

Lithium metal foil (thickness 160 μm) was used as a negative electrode.

3) Manufacture of Secondary Battery

A separator (polyethylene, 20 μm) was interposed between the positive electrode and the negative electrode to obtain an electrode assembly. The electrode assembly and the electrolyte were used to obtain a coin cell-type secondary battery. A mixed solvent of EC/EMC (1:1 volume ratio) was used as a non-aqueous solvent for the electrolyte used in this Comparative Example and $LiPF_6$ was used as a lithium salt. The concentration of the lithium salt in the electrolyte was 1 mol/L.

5. Evaluation of Characteristics of Battery (1) Initial Charge/Discharge Efficiency Each of the batteries according to Example 2-1 and Example 2-2 was used to evaluate the initial charge/discharge efficiency. Each battery was charged to 4.0V under a constant current condition of 0.1 C and discharged under the constant current condition to 2.1V at the first cycle, and then subjected to constant-current charging to 4.0V at 0.5 C and constant-current discharging to 2.1V during the second cycle to the fiftieth cycle in order to determine the life characteristics and capacity maintenance.

According to the present disclosure, capacity maintenance and initial charge/discharge efficiency are defined by the above Mathematical Formula 1 and Mathematical Formula 2, respectively.

Figure 7:
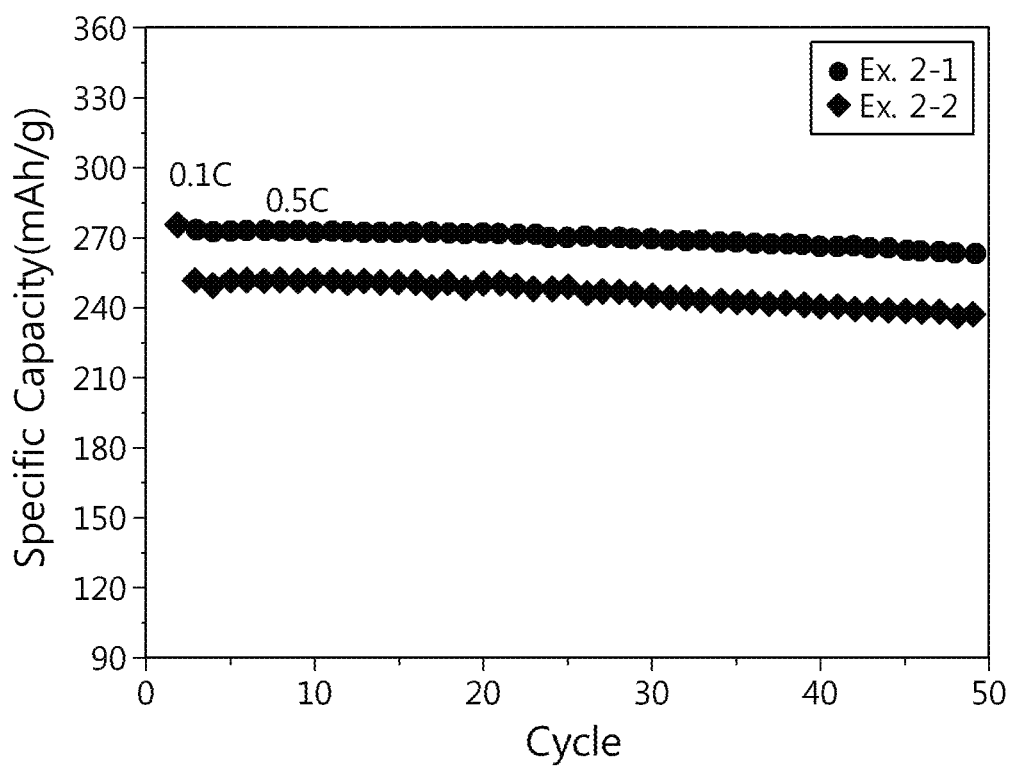
FIG. 7 is a graph illustrating the initial efficiency of Example 2-1 and that of Example 2-2 in comparison with each other.

FIG. 7 is a graph illustrating the initial charge/discharge efficiency and life characteristics of Example 2-1 and those of Example 2-2. It can be seen that the batteries according to Examples 2-1 and 2-2 show excellent initial charge/discharge efficiency and causes an insignificant decrease in capacity maintenance during 50 charge/discharge cycles.

(2) Comparison of Vanadium Dissolution

The batteries according to Examples 2-1 and 2-1 and Comparative Example 2-1 were determined in terms of vanadium dissolution. Each battery was broken after the charge/discharge test of the 50$^{th}$ cycle and the amount of vanadium present in the separator and the negative electrode was measured by using inductively coupled plasma (ICP). The results are shown in the following Table 5.

TABLE 5

| | Dissolution (wt %) (separator and negative electrode after 50 cycles) |
|---|---|
| Example 2-1 | 3.8 |
| Example 2-2 | 7.5 |
| Comparative Example 2-1 | 25.7 |

When Examples are compared with Comparative Example, the batteries according to Examples show a significant decrease in vanadium dissolution. It seems that such a decrease in vanadium dissolution affects improvement of the life characteristics and C-rate characteristics. The battery using vanadium oxide secondary particles according to Example 2-1 provides both improved life characteristics and improved C-rate characteristics, as compared to the other batteries. However, the battery according to Comparative Example shows significantly high vanadium dissolution.

What is claimed is:

1. A lithium ion secondary battery which comprises:
an electrode assembly and
an electrolyte,
wherein the electrode assembly comprises a positive electrode, a negative electrode and a separator interposed between the positive electrode and the negative electrode,
the positive electrode comprises vanadium oxide as a positive electrode active material,
the electrolyte comprises a non-aqueous solvent and a lithium salt,
the non-aqueous solvent comprises ethylene glycol dimethyl ether (DME), and
the lithium salt comprises lithium bis(fluorosulfonyl)imide (LiFSI);
wherein the vanadium oxide comprises secondary particles formed by assemblage of primary particles;
wherein the positive electrode comprises the vanadium oxide in an amount of 50 wt % or more based on a total weight of the positive electrode active material contained in the positive electrode; and
wherein the vanadium oxide comprises the vanadium oxide secondary particles in an amount of 70 wt % to 100 wt % based on a total weight of the vanadium oxide.

2. The lithium ion secondary battery according to claim 1, wherein a concentration of the lithium salt in the electrolyte is 0.5-7 mol/L.

3. The lithium ion secondary battery according to claim 2, wherein the concentration of the lithium salt in the electrolyte is 0.5-4 mol/L.

4. The lithium ion secondary battery according to claim 2, wherein the concentration of the lithium salt in the electrolyte is 4-7 mol/L.

5. The lithium ion secondary battery according to claim 1, wherein the vanadium oxide is $V_aO_b$ (wherein 1≤a≤6 and 2≤b≤13).

6. The lithium ion secondary battery according to claim 1, wherein the vanadium oxide primary particles have a particle diameter ($D_{50}$) of 10 nm-1 μm, and the vanadium oxide secondary particles have a particle diameter ($D_{50}$) of 500 nm-50 μm.

7. The lithium ion secondary battery according to claim 1, wherein the vanadium oxide secondary particles have a particle porosity of 0.1-35%.

8. The lithium ion secondary battery according to claim 1, wherein the vanadium oxide secondary particles have a specific surface area of 0.1 $m^2$/g-10 $m^2$/g.

9. The lithium ion secondary battery according to claim 1, wherein the non-aqueous solvent comprises DME in an amount of 40 wt % or more based on the total weight of the non-aqueous solvent.

10. The lithium ion secondary battery according to claim 1, wherein the non-aqueous solvent further comprises at least one selected from the group consisting of carbonate-based solvents, ester-based solvents, ketone-based solvents, alcohol-based solvents and aprotic solvents.

11. The lithium ion secondary battery according to claim 1, wherein the electrolyte further comprises at least one additional lithium salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein each of x and y represents an integer), LiCl, LiI and $LiB(C_2O_4)_2$ (lithium bis(oxalato) borate; LiBOB).

\* \* \* \* \*